April 13, 1965 W. B. DEAN 3,178,238
BRAKE APPARATUS
Filed Aug. 26, 1963
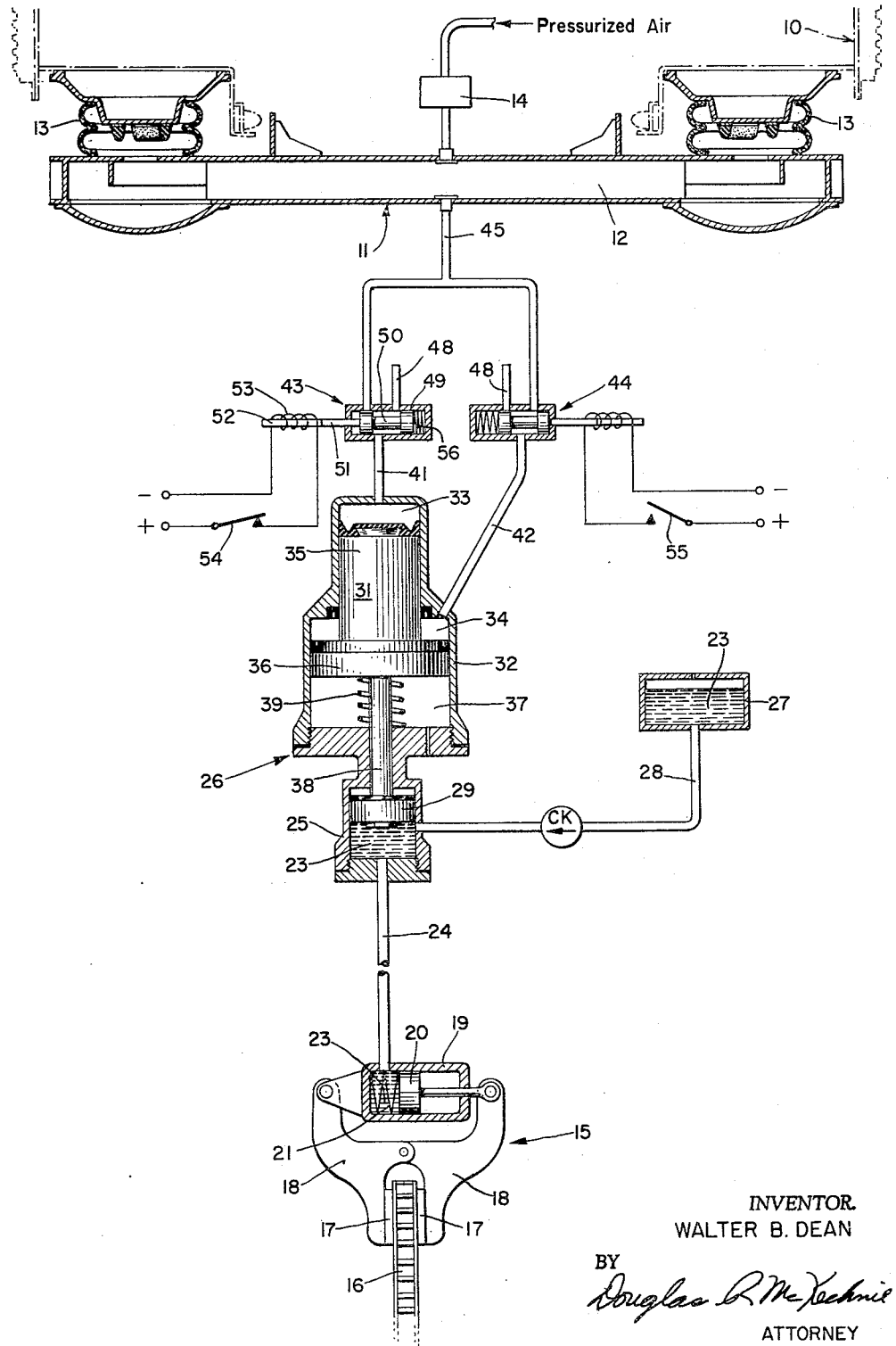
INVENTOR.
WALTER B. DEAN
BY
Douglas R. McKechnie
ATTORNEY 3,178,238
BRAKE APPARATUS
Walter B. Dean, Narberth, Pa., assignor to The
Budd Company, Philadelphia, Pa., a corporation
of Pennsylvania
Filed Aug. 26, 1963, Ser. No. 304,410
3 Claims. (Cl. 303—22)

This invention relates to a brake apparatus and, more particularly, to a load controlled brake apparatus for a railway car of the type having an air suspension system for supporting the car body. While not limited thereto, the invention is designed for use in railway cars having trucks of the type shown in U.S. Patent 2,908,230, Dean.

One of the objects of the invention is to provide a novel railway car brake apparatus that is responsive to the load of the car.

Another object is to provide a railway car brake apparatus for braking the car at a predetermined braking rate regardless of the load.

A further object is to provide a railway car brake apparatus wherein the force for operating a brake is derived from air pressure within the air suspension system for the car.

Still another object is to provide a brake arrangement having a brake actuated by forces generated within an air suspension system, wherein the amount of air that is bled from the air suspension system during braking, is minimized.

In accordance with the invention, the car body is supported by an air suspension system containing air at pressure proportional to the load. This pressurized air is fed to an expansible chamber device that is connected to actuate the car brakes directly, through a lever system, or through another expansible chamber device containing a hydraulic brake fluid. This latter method is preferred because it minimizes the amount of air that has to be bled from the air suspension system to activate the brakes.

Other objects and advantages of the invention will be apparent from the following description taken in connection with the accompanying drawing which is a schematic view of an illustrative railway car brake apparatus embodying the invention.

Referring now to the drawing, there is illustrated a brake apparatus for use in conjunction with a railway car having a car body 10 and a railway car truck 11 of the type disclosed in the above-mentioned patent to which reference can be had for a more detailed description thereof. Truck 11 comprises a hollow, transversely-extending truck bolster 12 that supports on its ends a pair of upwardly-extending, laterally-spaced resilient air springs 13 upon which car body 10 is sprung or mounted.

The interiors of air springs 13 and bolster 12 communicate with each other and contain pressurized air at the necessary pressure for resiliently supporting the car body on the springs at a predetermined height above the bolster. To maintain this predetermined height, an air leveling valve 14 is provided. Valve 14 is connected to a source of pressurized air and is operative to supply such pressurized air to the bolster or to exhaust air from the bolster in response to changes in the vertical distance between the car body and the bolster such as are caused by increases or decreases in the load. Obviously the magnitude of the air pressure in the bolster and air springs is directly proportional to the weight of the spring supported mass.

Mounted upon truck 11 is a disk brake 15 for braking the railway car. Disk brake 15 comprises a double-faced brake disk 16, a pair of non-metallic or ceramic-metallic brake shoes 17 that straddle the brake disk 16, and a pair of caliper type brake tong levers 18 that support brake shoes 17. Although only one disk brake 15 is shown, it is to be understood that the railway car can have as many additional disk brakes as necessary to effect the desired braking.

Disk brake 15 is of a hydraulically actuated type, and the actuating means for the disk brake comprises a brake cylinder 19 and an enclosed piston 20 that are connected to actuate the brake tong levers so as to force the brake shoes 17 against the brake disk 16 upon an increase in pressure in brake fluid 23 contained in cylinder 19. A helical compression spring 21, acting between piston 20 and cylinder 19, lightly biases the brake shoes towards the brake disk to maintain them in contact therewith, with a light force, so as to minimize the piston stroke and the required volume of brake fluid.

A conduit 24 is connected between cylinder 19 and cylinder 25 of a power cylinder device 26. Also connected to cylinder 25 is a conduit 28 that contains a check valve which allows makeup brake fluid to flow from a brake fluid reservoir 27 into cylinder 25. Cylinder 25 houses a piston 29 engaged with the enclosed brake fluid, the piston being operative, upon actuation of power cylinder device 26, to pressurize the enclosed brake fluid 23 so as to actuate disk brake 15.

Power cylinder device 26 also includes a dual diameter piston 31 and a cooperating dual diameter cylinder 32 arranged to define a pair of expansible chamber devices that comprise a pair of pressure chambers 33 and 34 respectively located adjacent to a circular piston 35 and an annular piston 36 which are integral and form dual diameter piston 31.

Although in the drawing the chambers 33 and 34 appear to have a substantial clearance, the clearance should be relatively small to minimize the amount of air required to actuate the piston 31 and thereby conserve the air in the air suspension system.

Beneath piston 31, cylinder 32 forms a low pressure chamber 37 which communicates with the atmosphere and encloses a return spring 39 that is coaxial with a piston rod 38 connecting pistons 29 and 31. Spring 39 biases pistons 31 and 29 upwardly, as viewed in the drawing, in the direction which relieves pressurization of the brake fluid caused by piston 29 actuating thereon.

Chambers 33 and 34 are connected by conduits 41 and 42 to a pair of electromagnetic control valves 43 and 44 whose operation is controlled by a pair of switches 54 and 55 connected in a circuit containing a suitable power source. Bolster 12 is connected to the control valves by a branched conduit 45. Also connected to valves 43 and 44 are exhaust conduits or outlets 48 that exhaust to atmospheric pressure.

Control valves 43 and 44 are identical so only one need be described in detail. With reference to valve 43, each control valve comprises a casing 49 having a bore which encloses a slidable valve member 50 that is movable between a venting position, wherein conduit 41 communicates with outlet 48 to place chamber 33 in communication with the atmosphere, and a braking position wherein conduit 41 communicates with conduit 45 to place chamber 33 in communication with the interior of bolster 12. Valve member 50 is biased towards the braking position by a spring 56 to provide a fail safe operation and is connected to a rod 51 that is integral with the plunger 52 of a solenoid 53 whereby energization of solenoid 53 moves the valve member to its venting position.

Normally, switches 54 and 55 are closed. Upon opening either switch, the associated solenoid 53 is deenergized allowing spring 56 to move valve member 50 to its braking position whereupon pressurized air flows from bolster 12 into the appropriate chamber until the pressures equalize. Subsequent closing of the switch energizes the solenoid to move valve member 50 to its venting position allowing the pressurized air in device 26 to exhaust to atmosphere.

The areas of pistons 35 and 36 differ and are chosen to be a predetermined ratio so that by pressurizing chambers 33 and 34 separately or simultaneously, three different braking rates can be obtained. Preferably, the areas are proportioned so that when only piston 35 is actuated, the braking rate is one mile per hour per second, when only piston 36 is actuated, the braking rate is two miles per hour per second, and when both pistons are actuated, the braking rate is three miles per hour per second.

In operation, as the load of the railway car varies, the pressure within the air suspension system changes proportionately. When the car is moving and it is desired to apply the brakes, one or both of switches 54 or 55 is opened, dependent upon the desired braking rate, thereupon pressurized air is supplied to the dual diameter piston 31. The pressurized air acting upon piston 31 forces piston 29 against the enclosed brake fluid 23 to increase the pressure therein to a magnitude dependent upon the ratio of the areas of piston 29 and piston 31 and therefore, proportional to the pressure acting upon piston 31 and to the load. This pressurization of brake fluid 23 actuates disk brake 15 in the manner previously described. When the desired amount of braking has been achieved, the control switches are closed causing whichever valves were actuated to exhaust air from device 26 allowing spring 39 to relieve the pressure within brake fluid 23.

While only a single embodiment has been illustrated it will be apparent to those skilled in the art that many changes can be made in the details and arrangements of parts without departing from the scope of the invention as defined in the appended claims.

What is claimed is:

1. In a railway car, the combination of: an air spring system for supporting the car body and containing air at a pressure directly proportional to the supported weight; a disk brake for braking the railway car, said disk brake comprising a double faced brake disk, a pair of brake shoes for braking said brake disk, and a pair of brake levers supporting said brake shoes; a pneumatically operated power device comprising piston means having portions of different diameters and defining faces having areas proportional one to another, cylinder means for receiving said piston means and cooperating to define expansible chambers therebetween, a plurality of valve means each connecting one of said chambers with said air spring system to admit pressurized air into and to exhaust air from said chamber, means operably connecting said power device to said brake levers to actuate the same from forces produced by the pressurized air of said air spring system, and means for selectively actuating said valve means to thereby obtain a desired braking rate.

2. The combination of claim 1 wherein said means operably connecting said piston to said brake levers comprises a hydraulic brake cylinder connected to said brake levers and containing a brake fluid, and a hydraulic expansible chamber device actuated by said power device for pressurizing said brake fluid.

3. In a railway car, the combination comprising: air suspension means supporting the car body and adapted to contain air at a pressure proportional to the weight of the car body and including the load supported therein, brake means for braking the car, hydraulic chamber means for controlling said brake means, a plural chambered expansible device, said device having a cylinder, a piston movable within said cylinder, rod means connected to one end of said piston and to said hydraulic chamber means, said piston having portions along its length of different diameters, said portions including face areas proportional one to another and cooperating with internal wall surfaces of said cylinder to define a plurality of expansible chambers therewithin, a plurality of valve means, each valve means being connected to an associated expansible chamber and connected to said air pressure means to admit in one state of operation air into said chamber to move said piston in one direction at a rate corresponding to the area of the face portion of the piston therewithin, and in another state of operation to vent air from said associated expansible chamber, and means for selectively operating said plurality of valve means to thereby brake the car at a selected predetermined rate.

References Cited by the Examiner

UNITED STATES PATENTS

| 2,194,762 | 3/40 | Maliphant | 303—21 |
| 2,991,130 | 7/61 | Sampietro | 303—22 |
| 3,002,791 | 10/61 | Pease | 303—22 X |

FOREIGN PATENTS

| 773,158 | 4/57 | Great Britain. |
| 1,114,521 | 10/61 | Germany. |

ARTHUR L. LA POINT, *Primary Examiner.*
EUGENE G. BOTZ, *Examiner.*